Figure 1:
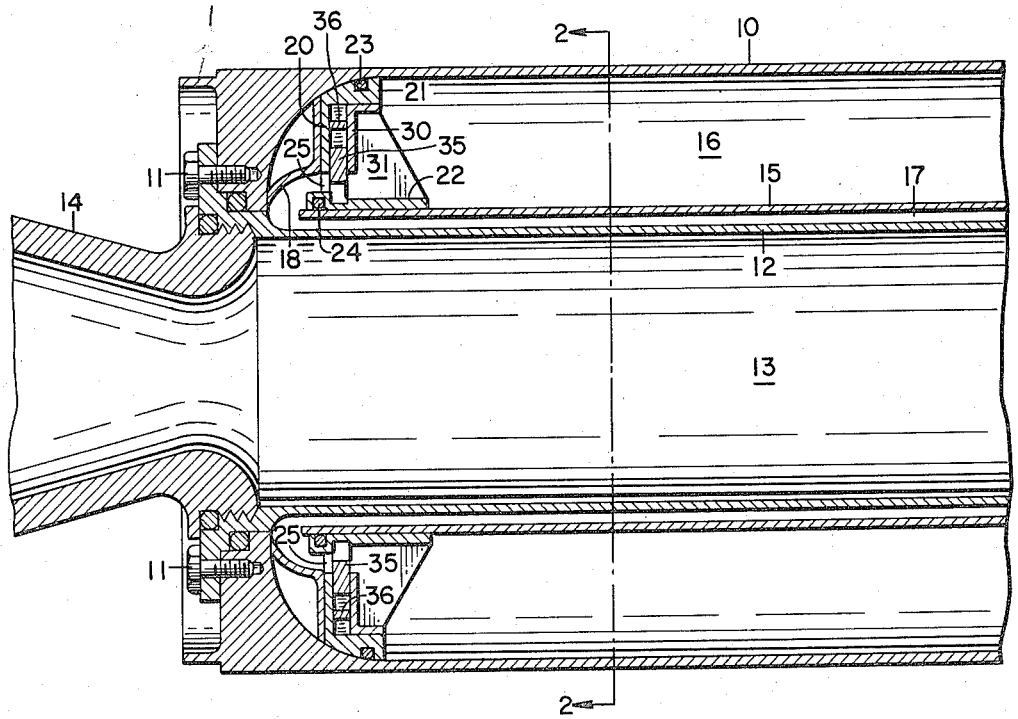

Feb. 7, 1956     W. F. KAUFMAN ET AL     2,733,726

ACCELERATION ACTUATED OUTLET VALVE

Filed Sept. 24, 1954

INVENTOR
WARREN F. KAUFMAN
MARK I. HOFFMAN

BY

ATTORNEYS

United States Patent Office 2,733,726
Patented Feb. 7, 1956

2,733,726

ACCELERATION ACTUATED OUTLET VALVE

Warren F. Kaufman, Garden Grove, and Mark I. Hoffman, Whittier, Calif., assignors, by mesne assignments, to the United States of America as represented by the Secretary of the Navy Application September 24, 1954, Serial No. 458,296

5 Claims. (Cl. 137—38)

The present invention relates to an acceleration actuated outlet valve and more particularly to such a device incorporating a slidable annular ring which is adapted to be actuated by acceleration forces such as to alternately cover or uncover various discharge ports of the valve.

The invention device is adapted for use in any type of storage or fuel tank which may be subjected to sidewise or lateral accelerations and is especially adapted for use as the outlet valve of the fuel tank in a rocket utilizing liquid propellants. In rockets of this type, the fuel tank is of a generally annular configuration and is disposed circumferentially about the compression chamber of the rocket. A liquid propellant is disposed within the tank and it has been found preferable to feed the propellant to the rocket motor by applying gas under pressure against the propellant in the tank, thereby eliminating more complicated feeding systems. In such an arrangement, an outlet valve is ordinarily disposed at the rear of the tank, and the pressurized gas is introduced at the forward end of the tank thereby forcing the liquid propellant rearwardly toward the outlet valve.

During accelerated flight of a rocket, the missile structure is usually subjected to lateral accelerations, causing the propellant in the fuel tank thereof to be displaced laterally. Due to practical limitations, there is only a limited amount of pressurized gas that is available to be applied to the propellant in the fuel tank; and as the tank approaches the empty condition, there is the possibility that this limited amount of gas may be lost through an uncovered outlet port as the liquid propellant is shifted laterally due to sidewise accelerations of the missile structure. If such action takes place, it is apparent that the remainder of the propellant in the tank will not be forced into the feed line and burned usefully in the power plant. By preventing such premature loss of gas pressure, the amount of unexpended propellant will be reduced thereby increasing the range, accuracy, burn-out velocity and mass ratio of the rocket.

The present invention eliminates the premature loss of gas pressure by providing a series of circumferentially spaced outlet ports and an annular ring slidably disposed adjacent thereto. The ring is normally urged into a centered position such that all of the outlet ports are partially open, but upon lateral acceleration of the missile structure, the ring is adapted to be laterally displaced relative to the outlet ports such that some of the ports may be completely covered to prevent loss of the pressurized gas.

An object of the present invention is the provision of a new and novel acceleration actuated outlet valve adapted to reduce the amount of unexpended propellant in a gas pressurized liquid propellant tank.

Another object is to provide an acceleration actuated outlet valve which is entirely automatic in operation and does not require any prefiring service.

A further object of the invention is the provision of an acceleration actuated outlet valve which is simple and inexpensive in construction, yet sturdy and reliable in operation.

Figure 2:
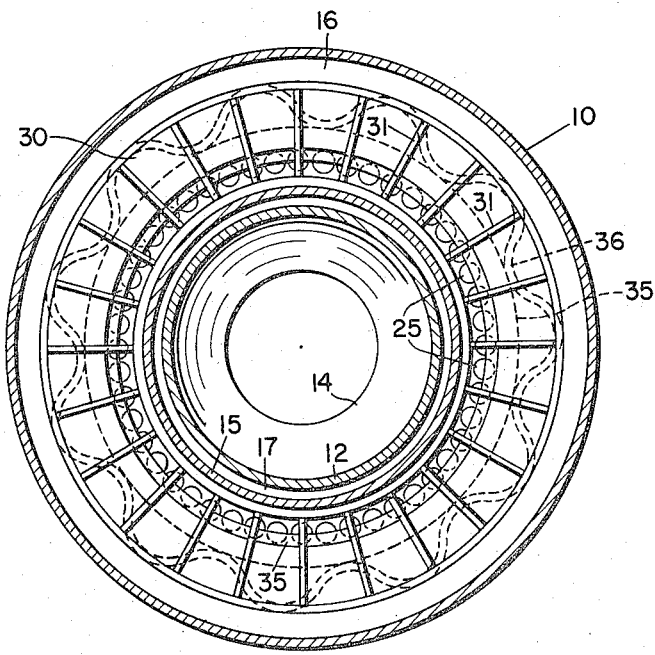

Other objects and many of the attendant advantages of this invention will be readily appreciated as the same becomes better understood by reference to the following detailed description when considered in connection with the accompanying drawings wherein:

Fig. 1 is a partial longitudinal section through a rocket employing the invention device, and Fig. 2 is a cross-sectional view taken on the line 2—2 of Fig. 1, looking in the direction of the arrows.

Referring now to the drawing wherein like reference characters designate like parts throughout several views, there is shown an outer rocket or missile body 10, which is substantially cylindrical in configuration and which is secured by means of suitable connectors 11 to an inner cylindrical body portion 12 which is also substantially cylindrical in configuration and has the thrust or firing chamber 13 formed therein. A conventional exhaust cone 14 is suitably secured to the rear portion of the rocket.

A cylindrical member 15 is spaced from member 13, thereby providing an annular fuel tank or storage space 16 between the inner surface of member 10 and the outer surface of member 15, and a fuel feed passage 17 between the inner surface of member 15 and the outer surface of member 12. A baffle 18 is suitably secured to the rear wall of member 10 to provide a curved guide portion for directing the liquid propellant from tank 16 into passage 17.

An annular outlet valve plate 20 has flanged portions 21 and 22 formed at opposite ends thereof, these flanged portions being suitably secured respectively to the inner surface of member 10 and the outer surface of member 15. Conventional O-ring seals 23 and 24 are disposed in suitable recesses formed in the valve plate for sealing the plate with respect to members 10 and 15. Plate 20 has a plurality of circumferentially spaced outlet ports 25 formed longitudinally therethrough, each of said ports being in communication with passage 17.

An annular retainer member 30 is suitably connected to the inner surface of flange 21 and has a plurality of radially extending circumferentially spaced baffles 31 secured thereto. An annular valve ring 35 is slidably disposed between members 20 and 30 and its radial dimensions are such that it is adapted to completely cover some of ports upon lateral displacement thereof as may be clearly seen in Fig. 2. A circular expansion ring 36 is disposed between and in engagement with the inner surface of flange 21 and the outer surface of ring 35 whereby the ring is normally urged into a centered position with respect to outlet openings 25 as shown in Fig. 2.

When ring 35 is in centered position, it is apparent that all of the outlet ports are partially open thereby enabling the liquid propellant to be forced out through all of the outlet ports into passage 17. The ring mass, propellant mass, ring friction, and the spring force are so related by proper design that the valve ring moves with the liquid propellant, thereby covering the outlet openings which are moving laterally away from the propellant upon sidewise acceleration and uncovering more of the outlet openings on that side toward which the propellant is moving.

In operation, gas pressure is introduced at the forward end of the rocket and the rocket fires, taking off in accelerated flight. The forward acceleration of the rocket is great enough to force the propellant rearward against the outlet valve and materially assist in keeping all the outlet ports covered with liquid while the tank is being emptied. However, lateral acceleration of sufficient magnitude carries the missile structure and the propellant tank laterally, but because of inertia the propellant mass and the valve ring are not displaced as much in a sidewise direction. The valve ring will accordingly cover those openings in the valve plate which are moving away from the propellant mass thereby preventing premature loss of the pressurized gas in the tank. The baffles minimize the sidewise motion of the propellant particularly as the mass thereof becomes quite small. These baffles also tend to retain small amounts of propellants in the compartments formed therebetween whereby a liquid seal is maintained across the outlet openings.

While the invention device has been described as being utilized in a gas pressurized type fuel system, it is also apparent that it may be employed in a pump pressurized system, greatly lowering the amount of air and vapor which would be sucked out of a fuel tank outlet when the tank is nearly empty and the fuel is being thrown away from its usual outlet by lateral acceleration.

From the foregoing it is apparent that there is provided a new and novel acceleration actuated outlet valve which reduces the amount of unexpended propellant in a gas pressurized tank and which is entirely automatic in operation and does not require any prefiring service. The device is simple and inexpensive in construction, yet it is sturdy and reliable in operation.

Obviously many modifications and variations of the present invention are possible in the light of the above teachings. It is therefore to be understood that within the scope of the appended claims the invention may be practiced otherwise than as specifically described.

We claim:

1. An acceleration actuated outlet valve which comprises annular plate means having a plurality of circumferentially spaced openings formed therethrough, annular retainer means secured to said plate means and having a portion spaced therefrom, a plurality of baffle means secured to said retainer means, annular valve ring means slidably disposed adjacent said openings and disposed between said plate means and said retainer means, and resilient means disposed between said plate means and said ring means for normally urging said ring means into a centered position.

2. An acceleration actuated outlet valve which comprises annular plate means having a plurality of circumferentially spaced openings formed therethrough, annular retainer means secured to said plate means and having a portion spaced therefrom, a plurality of radially extending circumferentially spaced baffle means secured to said retainer means, annular valve ring means slidably disposed adjacent said openings and disposed between said plate means and said retainer means, and resilient means disposed between an inner surface of said plate means and the outer surface of said ring means for normally urging said ring means into a centered position.

3. An acceleration actuated outlet valve which comprises annular plate means having a plurality of circumferentially spaced openings formed therethrough and having a flange formed integral therewith, annular retainer means secured to the inner surface of said flange and having a portion spaced from a lateral surface of said plate means, a plurality of radially extending circumferentially spaced baffle means secured to said retainer means, annular valve ring means slidably disposed adjacent said openings and disposed between said plate means and said retainer means, and spring means disposed between the inner surface of said flange and the outer surface of said ring means for normally urging said ring means into a centered position.

4. In combination body means having a hollow annular storage means formed therein, an acceleration actuated outlet valve means positioned at one end of said storage means, means for sealing said valve means with respect to said storage means, said valve means comprising annular plate means having a plurality of circumferentially spaced openings formed therethrough, annular retainer means secured to said plate means and having a portion spaced therefrom, a plurality of baffle means secured to said retainer means, annular valve ring means slidably disposed adjacent said openings and disposed between said plate means and said retainer means, and resilient means disposed between said plate means and said ring means into a centered position.

5. In combination, body means having a hollow annular storage means formed therein, an acceleration actuated outlet valve means positioned at one end of said storage means, means for sealing said valve means with respect to said storage means, said valve means comprising annular plate means having a plurality of circumferentially spaced openings formed therethrough, a fuel line in communication with each of said openings, annular retainer means secured to said plate means and having a portion spaced therefrom, a plurality of radially extending circumferentially spaced baffle means secured to said retainer means, annular valve ring means slidably disposed adjacent said openings and disposed between said plate means and said retainer means, and resilient means disposed between an inner surface of said plate means and the outer surface of said ring means for normally urging said ring means into a centered position.

References Cited in the file of this patent

UNITED STATES PATENTS

| | | |
|---|---|---|
| 1,509,695 | Volet | Sept. 23, 1924 |
| 2,630,815 | Worthing | Mar. 10, 1953 |